United States Patent [19]
Frederick

[11] 3,827,121
[45] Aug. 6, 1974

[54] METHOD OF AND APPARATUS FOR REPAIRING CARDAN TYPE UNIVERSAL JOINTS AND PROTECTIVE BOOT

[76] Inventor: Ralph M. Frederick, 2124 Lakeview Dr., Ypsilanti, Mich. 48197

[22] Filed: Mar. 14, 1973

[21] Appl. No.: 341,240

[52] U.S. Cl.............. 29/149.5 B, 29/201, 29/401, 29/441
[51] Int. Cl..... B23p 11/00, B23p 7/00, B23p 19/04
[58] Field of Search . 29/149.5 B, 148.4 B, 148.4 A, 29/401.7, 200 B, 200 P, 201, 434, 441; 282/87

[56] References Cited
UNITED STATES PATENTS

| | | | |
|---|---|---|---|
| 2,780,080 | 2/1957 | Cork | 64/8 X |
| 3,023,038 | 2/1962 | White | 287/87 |
| 3,404,448 | 10/1968 | Schonfeld | 29/201 X |
| 3,447,232 | 6/1969 | Stillwagon, Jr. | 29/434 |
| 3,570,090 | 3/1971 | Teramachi | 29/149.5 B |

*Primary Examiner*—Thomas H. Eager
*Attorney, Agent, or Firm*—Harness, Dickey & Pierce

[57] ABSTRACT

A method of and apparatus for repairing the worn balls of the ball and socket connections for double Cardan type universal joints. The apparatus includes a fixture that cooperates with the yokes of the drive shaft for accurately locating the drive shaft. The worn ball is then machined off to leave a pilot portion having an accurately formed locating surface. A new ball having an opening complementary to the pilot portion is press fit onto the pilot portion to complete the repair. In addition, a protective boot is disclosed for protecting the ball and socket connection of the repaired joint to prevent dirt and other abrasives from impinging on the sliding surface of the joint.

3 Claims, 6 Drawing Figures

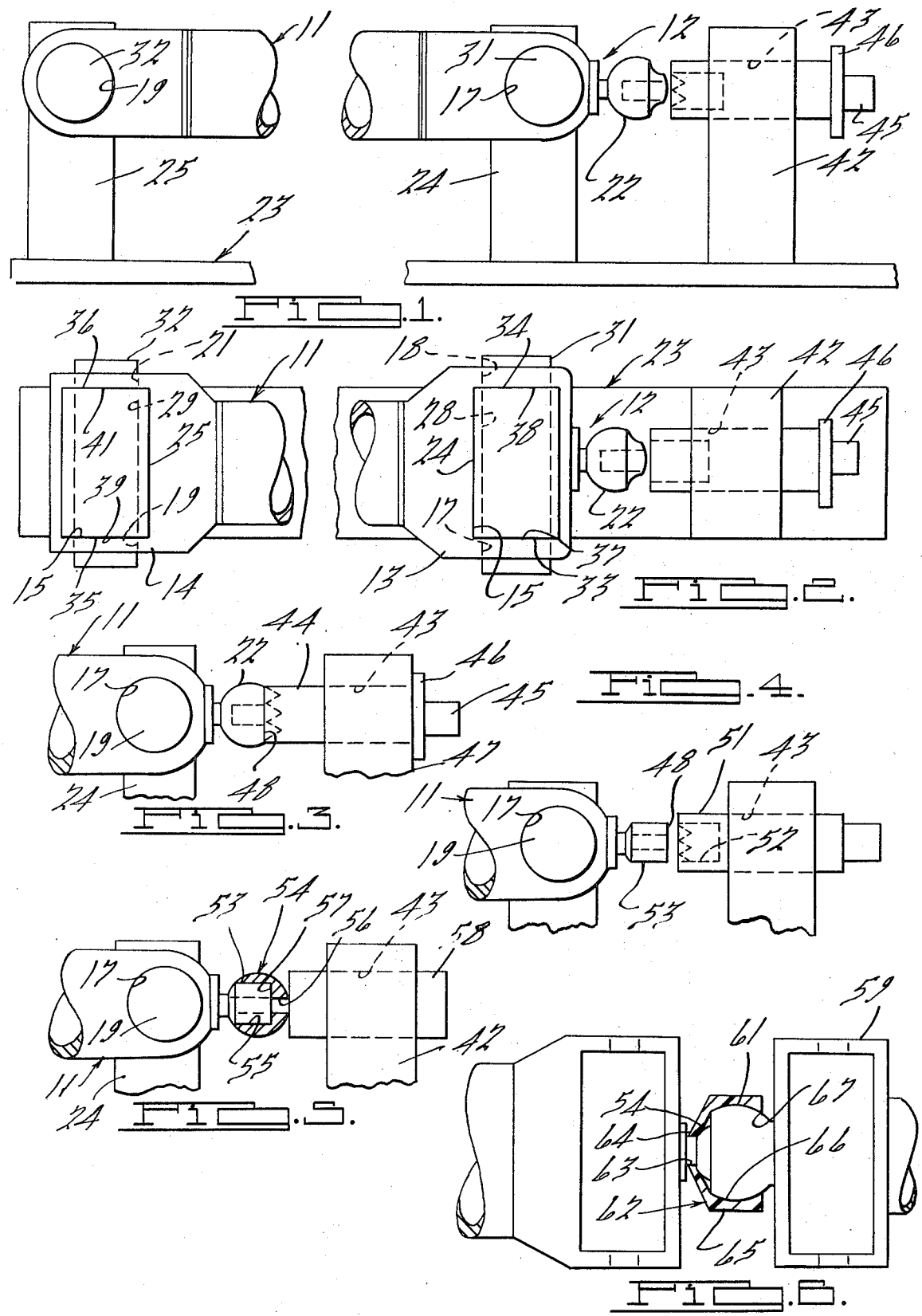

3,827,121

METHOD OF AND APPARATUS FOR REPAIRING CARDAN TYPE UNIVERSAL JOINTS AND PROTECTIVE BOOT

BACKGROUND OF THE INVENTION

This invention relates to a method of and apparatus for repairing ball and socket connections, particularly those of the double Cardan universal type joint and to a protective boot for such joints.

In one form of drive shaft universal joint, known as the double Cardan type, two pairs of universals connect the driving and driven shafts. A ball and socket connection is also provided between the driving and driven shafts. With this type of joint, in addition to the universal elements becoming worn, the balls of the ball and socket connection frequently wear permitting the shafts to whip relative to each other. It has been proposed to repair such joints by cutting off the worn balls and assembling new balls onto the shaft. With this type of joint, however, it is extremely important that the ball be accurately located relative to the yoke of the shaft. This is very difficult with the methods and apparatus heretofore proposed.

It is, therefore, a principal object of the invention to provide an improved method of and apparatus for repairing double Cardan type universal joints.

It is a further object of the invention to provide an improved method of and apparatus for repairing the balls of ball and socket connections, particularly as applied to the aforenoted type of universal joint.

As has been noted, it is particularly important to maintain a close fit between the ball and socket of a double Cardan type universal joint to prevent undue shaft whip and high wear of the other components of the joint. One reason for the wear of such joints is the ingress of dirt and other abrasive material on the ball and socket connection. A great deal of this wear can be eliminated if the ball and socket joint is protected by an effective boot or seal.

It is, therefore, still another object of the invention to provide an improved dust seal or boot for a ball and socket connection.

SUMMARY OF THE INVENTION

A first feature of this invention is adapted to be embodied in a method for repairing ball joints. The method comprises the step of machining a worn ball to remove its worn outer surface while retaining a pilot portion. A new ball is formed having an opening that is complementary to the pilot portion. This new ball is positioned on and affixed to the pilot portion.

Another feature is adapted to be embodied in a machine for repairing double Cardan type universal joints that include a shaft having a yoke adapted to receive the ends of a crosspiece of the joint cruciform, a member and an adjacent ball affixed to the shaft. The machine comprises a fixture adapted to coact with the drive shaft yoke for accurately locating the yoke and the associated ball. Forming tool means are located relative to the fixture for machining a worn ball to form a pilot portion that is adapted to receive and locate a new ball.

Yet another feature of the invention is adapted to be embodied in a protective boot for a ball joint or the like comprising an elastomer body having a base portion defining an opening adapted to sealingly engage a shank formed adjacent the ball of the joint. A skirt portion is integrally connected to the base portion and is sized to encompass the socket of the joint. The skirt portion terminates in a seal portion that is adapted to sealingly engage the socket.

BRIEF DESCRIPTION OF THE DRAWINGS

FIG. 1 is a side elevational view of a forming apparatus adapted to repair double Cardan type universal joint that embodies this invention and which is adapted to perform a method embodying this invention.

FIG. 2 is a top plan view of the apparatus.

FIG. 3 is a side elevational view, in part similar to FIG. 1, showing the forming operation by which the locating shoulder is formed on the worn ball.

FIG. 4 is a side elevational view, in part similar to FIG. 1 and FIG. 3, showing the drive shaft as it appears after the pilot portion has been completely formed.

FIG. 5 is a side elevational view, with a portion shown in section, similar to FIGS. 1, 3 and 4 showing the new ball being pressed into place.

FIG. 6 is a side elevational view, with portions shown in section, of a partially completed repaired universal joint embodying a dust seal incorporating another feature of the invention.

DETAILED DESCRIPTION OF THE PREFERRED EMBODIMENTS

In the drawings a portion of an automotive drive shaft is identified generally by the reference numeral 11. The drive shaft 11 forms one section of the total drive shaft and is adapted to be connected, by means of a double Cardan type universal joint, which is only partially shown and is identified generally by the reference numeral 12, to an adjacent shaft portion. It is to be understood that the terms drive, driving and driven are used interchangeably and that the invention may be used with the repair of either driving or driven shafts.

At each end of the drive shaft 11 respective yokes 13 and 14 are formed at central openings 15 and 16 that are formed with aligned bores 17, 18 and 19, 21. The pairs of openings, 17, 18 and 19, 21 are adapted to receive the cross pieces of a cruciform member that forms one of the Cardan joints. The shaft end carrying the yoke 13 is adapted to be connected to an adjacent shaft end (not shown) by means of a double Cardan type joint. For this purpose, the yoke carries a ball 22 at its outer end which ball is adapted to cooperate with a socket of the unshown adjacent shaft end.

The balls 22 frequently become worn in use, such wear being illustrated in FIGS. 1 and 2. The degree of wear has been exaggerated for the purpose of explanation.

When repairing these joints to refurbish the worn ball 22 it is extremely important that the refinished surface of the ball 22 be accurately located relative to the yoke 13 and particularly the openings 17 and 18 of the yoke. The apparatus, now to be described, insures this result. The apparatus includes a locating fixture, indicated generally by the reference numeral 23 that accurately locates the shaft 12. The fixture 23 includes a pair of upstanding trunnions 24 and 25 that are adapted to extend into central openings 15 and 16 of the respective yokes 13 and 14. The trunnions 24 and 25 are formed with bored openings 28 and 29 that are of comparable size to the yoke openings 17, 18 and 19, 21. When the yoke openings 15 and 16 are positioned on the trunnions 24 and 25 the openings 17, 18 and 19, 21 are aligned with the bored fixture openings 28 and 29, respectively. Locating pins 31 and 32 are then placed through these openings to accurately position the shaft 11. The trunnions 24 and 25 also have machined surfaces that cooperate with respective machined surfaces of the yoke openings 15 and 16 to complete the locating function. These surfaces may comprise oppositely facing surfaces 33, 34 of the trunnion 24 and 35, 36, of the trunnion 25. The surfaces 33, 34 and 35, 36 engage machined surfaces 37, 38 and 39, 41 of the yoke openings 15 and 16 respectively.

It should thus be readily apparent that the drive shaft 11 is accurately located by the fixture 23. Adjacent the fixture 23 an upstanding machine tool support 42 is formed that is juxtaposed to the worn ball 22. The support 42 is formed at a bored opening 43 that is extremely accurately located and is concentric with the axis of the ball 22. The bored opening 43 is adapted to receive selected machine tools, as will become apparent.

When the drive shaft 11 is accurately located as aforedescribed the worn ball 22 is machined off to form an accurately located and sized pilot portion. This is done by first positioning an end milling cutter 44 (FIG. 3) in the machine tool support opening 43. The milling cutter 44 has a driven end 45 that is adapted to be connected to a suitable power source for rotating and axially feeding the cutter 44 in the bore 43. A shoulder 46 is formed on the cutter 44 adjacent a locating surface 47 of the machine tool support 42 for limiting the axial movement of the cutter 44. As noted in FIG. 3, the cutter 44 machines the ball 22 to form an accurately located axial shoulder 48 on the worn ball 22.

After the shoulder 48 is formed the end milling cutter 44 is removed and a hollow milling cutter 51 is positioned in the machine tool support opening 43 (FIG. 4). The hollow milling cutter 51 has an interior cutting surface 52 that is adapted to machine the worn ball 22 to form an accurate cylindrical outer surface 53 thereupon. The surface 53 and shoulder 48 form a pilot portion.

The pilot portion comprised of the surface 53 and shoulder 48 are adapted to receive a replacement ball, indicated generally by the reference numeral 54 (FIG. 5). The replacement ball 54 is formed with a stepped counterbore comprised of a large diameter portion 55 and a smaller diameter portion 56 between which is formed a shoulder 57. The ball 54 is adapted to be press fit onto the pilot portion by means of a pressing tool 58 that is slidably supported in the machine tool support bore 43. The opening 55 is sized so as to afford a press fit onto the pilot portion 53 and the shoulder 57 engages the shoulder 48 so as to provide an extremely accurate axial location for the replacement ball 54. Repair of the drive shaft is thus completed and the repair shaft may then be removed from the fixture 11.

In order to protect the repaired joint which includes the new ball 54 and an adjacent shaft section 59 having a cooperating socket 61 (FIG. 6) a protective boot 62 is provided. The protective boot 62 is formed with a first seal portion 63 that is complementary to the shank 64 formed adjacent the ball 54. The seal 63 may be deformed and slid over the ball 54 to sealingly engage the shank 64.

The seal 62 is elastomeric and has an integral skirt portion 65 that has a central opening 66 complementary to the socket 61 and adapted to extend therearound. The periphery of the skirt 65 has a lip 67 that sealingly engages the socket 61 to complete the enclosure of the ball and socket and to protect from dirt and other foreign matter.

It is to be understood that the foregoing disclosure is that of a preferred embodiment of the invention. Various changes and modifications may be made without departing from the spirit and scope of the invention as defined by the appended claims.

I claim:

1. The method of repairing ball joints comprising the steps of machining a worn ball to remove its worn outer surface and form a pilot portion and an axial shoulder at the axial outer end of the pilot portion, positioning a new ball having an opening complementary to said pilot portion and a smaller diameter opening at the end of the first-mentioned opening to form a shoulder on said pilot portion with the ball shoulder in engagement with the axial shoulder of the pilot for axially locating the ball on the pilot portion and affixing said new ball to said pilot portion.

2. The method of repairing ball joints as set forth in claim 1 wherein the pilot portion is formed as a cylindrical surface.

3. The method as set forth in claim 1 wherein the ball joint forms a portion of a double Cardan type universal joint and further including the step of accurately locating the adjacent yoke of the shaft during the machining of the worn ball.

* * * * *